US008021019B2

(12) United States Patent
Chen et al.

(10) Patent No.: US 8,021,019 B2

(45) Date of Patent: Sep. 20, 2011

(54) LIGHT-EMITTING DIODE LIGHTING DEVICE WITH MULTIPLE-LAYERED SOURCE

(75) Inventors: Chien-Yuan Chen, Taipei (TW); Ying-Te Chuang, Kaohsiung (TW); Yi-Sheng Chen, Taipei (TW)

(73) Assignee: Power Data Communications Co., Ltd., Taipei County (TW)

( * ) Notice: Subject to any disclaimer, the term of this patent is extended or adjusted under 35 U.S.C. 154(b) by 373 days.

(21) Appl. No.: 12/431,768

(22) Filed: Apr. 29, 2009

(65) Prior Publication Data

US 2010/0091497 A1 Apr. 15, 2010

(30) Foreign Application Priority Data

Oct. 15, 2008 (TW) ............................... 97139561 A

(51) Int. Cl.

| | |
|---|---|
| ***F21S 4/00*** | (2006.01) |
| ***F21S 8/06*** | (2006.01) |
| ***F21V 21/00*** | (2006.01) |
| ***F21V 11/00*** | (2006.01) |
| ***F21V 17/06*** | (2006.01) |
| ***B60Q 1/00*** | (2006.01) |
| ***B60Q 3/00*** | (2006.01) |

(52) U.S. Cl. .............. 362/249.06; 362/249.02; 362/442; 362/405; 362/370; 362/249.14

(58) Field of Classification Search ............. 362/249.02, 362/249.06, 442, 404–408, 370, 371, 249.14, 362/419, 422

See application file for complete search history.

(56) References Cited

U.S. PATENT DOCUMENTS

| | | | | |
|---|---|---|---|---|
| 4,107,770 | A * | 8/1978 | Weber | 362/405 |
| 4,956,757 | A * | 9/1990 | Wang | 362/249.14 |
| 5,632,553 | A * | 5/1997 | Huang | 362/410 |
| 6,402,339 | B1 * | 6/2002 | Mukogawa et al. | 362/184 |
| 6,422,722 | B1 * | 7/2002 | Voltolina | 362/405 |
| 6,502,957 | B1 * | 1/2003 | Klaitman | 362/249.01 |
| 7,883,242 | B2 * | 2/2011 | Ng et al. | 362/249.06 |

* cited by examiner

*Primary Examiner* — James Lee
*Assistant Examiner* — David Makiya
(74) *Attorney, Agent, or Firm* — Leong C. Lei

(57) ABSTRACT

A lighting device includes a cover, a cap, a central post having opposite ends coupled to the cover and the cap respectively, and a plurality of first and second frames. The cover and the cap both form a plurality of circumferentially distributed slots opposite to each other. The first and second frames have ends respectively fit into the slots of the cover and the cap and each frame carries at least one light-emitting diode. As such, a light-emitting diode lighting device that is hollow, light-weighted, and exhibiting excellent heat dissipation is formed.

12 Claims, 6 Drawing Sheets

LIGHT-EMITTING DIODE LIGHTING DEVICE WITH MULTIPLE-LAYERED SOURCE

TECHNICAL FIELD OF THE INVENTION

The present invention generally relates to a light-emitting diode lighting device, and particularly to a light-emitting diode lighting device that comprises multiple layers of lighting sources.

DESCRIPTION OF THE PRIOR ART

A conventional lighting device, especially a high-power lighting device, such as a street lamp, a projection light, a large-sized decoration light, and advertisement lighting, consumes a large amount of power and generates a large amount of heat. Further, such a conventional lighting device is bulky and is susceptible to breaking, and is poor at heat resistance, whereby the life cycle is short, and expensively in costs.

The recent development of light-emitting diodes makes a wide application of the light-emitting diode in lighting devices. Due to the advantages of having less amount of heat generated, being more resistant to high temperature, and low costs provided by light-emitting diodes, light-emitting diode based lighting devices improve both quality and life span thereof.

However, in practical applications, due to the properties of the light-emitting diodes, a light-emitting diode based lighting device provides enhanced performance in low-power application compared to the traditional lighting. Yet in high-power applications, the light-emitting diode based lighting device does not offer a fine enough quality. Firstly a high power driven lightning device, even adopt light-emitting diode as light source, generates considerable amount of heat. In order to remove such a large amount of heat, large-sized heat dissipation fins must be attached to the lighting device in general modern design. Consequently, the lighting device is put greatly on weight thereof due to the large-scale heat dissipation fins and the light-emitting diode assembly being together mounted inside a heavy and bulky enclosure, and the aesthetics of the lighting device is also deteriorated. This brings major challenge to the industry.

Prior arts disclosed in for example U.S. Pat. No. 4,160,286, which shows a traditional street lamp having a thick glass panel and enclosure that result in heavy weight. This is a major disadvantage. Taiwan Patent Nos. I297382, M334912, M323561, and M323562 provide lighting device that encloses heat dissipation fins inside an enclosure or integrally combines the heat dissipation fins with the enclosure. This fails to solve the weight problem effectively and on the contrary, leads to poor heat dissipation due to the poor heat dissipation performance of the heat dissipation fins for no sufficient air ventilation is allowed.

Further, all the known lighting devices discussed above, especially the light-emitting diode based lighting device, are often arranged in a matrix through the arrangement of a grating member. The configuration is monotonous and dull and lacks versatilities, which lessens the applications of the lighting device. It is particularly noted that the conventional lighting device, once the lamp pole thereof being properly set up, can only provide lighting in a fixed, generally downward, direction. This is another major disadvantage of the lighting devices in prior arts.

SUMMARY OF THE INVENTION

An objective of the present invention is to provide a lighting device that features excellent at heat dissipation and light weight with multiple layers of lighting sources.

Compared to the mentioned prior arts, the present invention provides a lighting device that comprises a heat dissipation structure integrally combined with a shade of the lighting device. Structurally, the lighting device comprises a cover and a cap, both forming a plurality of circumferentially distributed slots, a central post having opposite ends coupled to the cover and the cap respectively, and a plurality of first and second frames, which are elongate and made of metals of excellent heat dissipation capability, each frame carrying at least one light-emitting diode. An end of each of the first and second frames is fit into a respective one of the slots of the cover and the cap to thereby form a three-dimensionally structured light-emitting diode lighting device that is hollow, light-weighted, and has excellent heat dissipation space.

In an embodiment of the present invention, the central post is further provided with at least one layer of third frames to thereby form a multiple-layered lighting device.

The foregoing objective and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
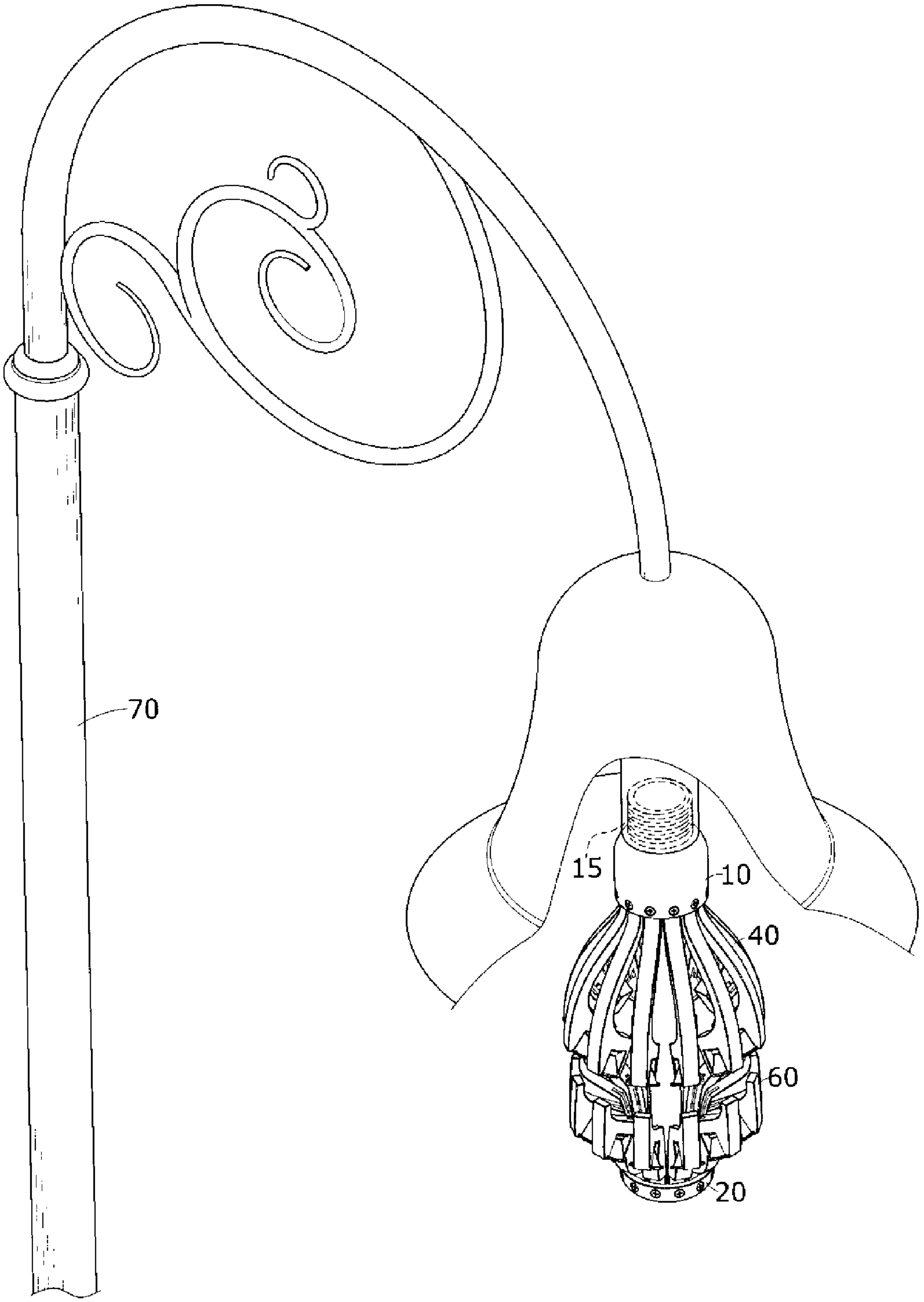
FIG. 1 is a perspective view showing a lighting device constructed in accordance with an embodiment of the present invention attached to a support arm.
Figure 2:
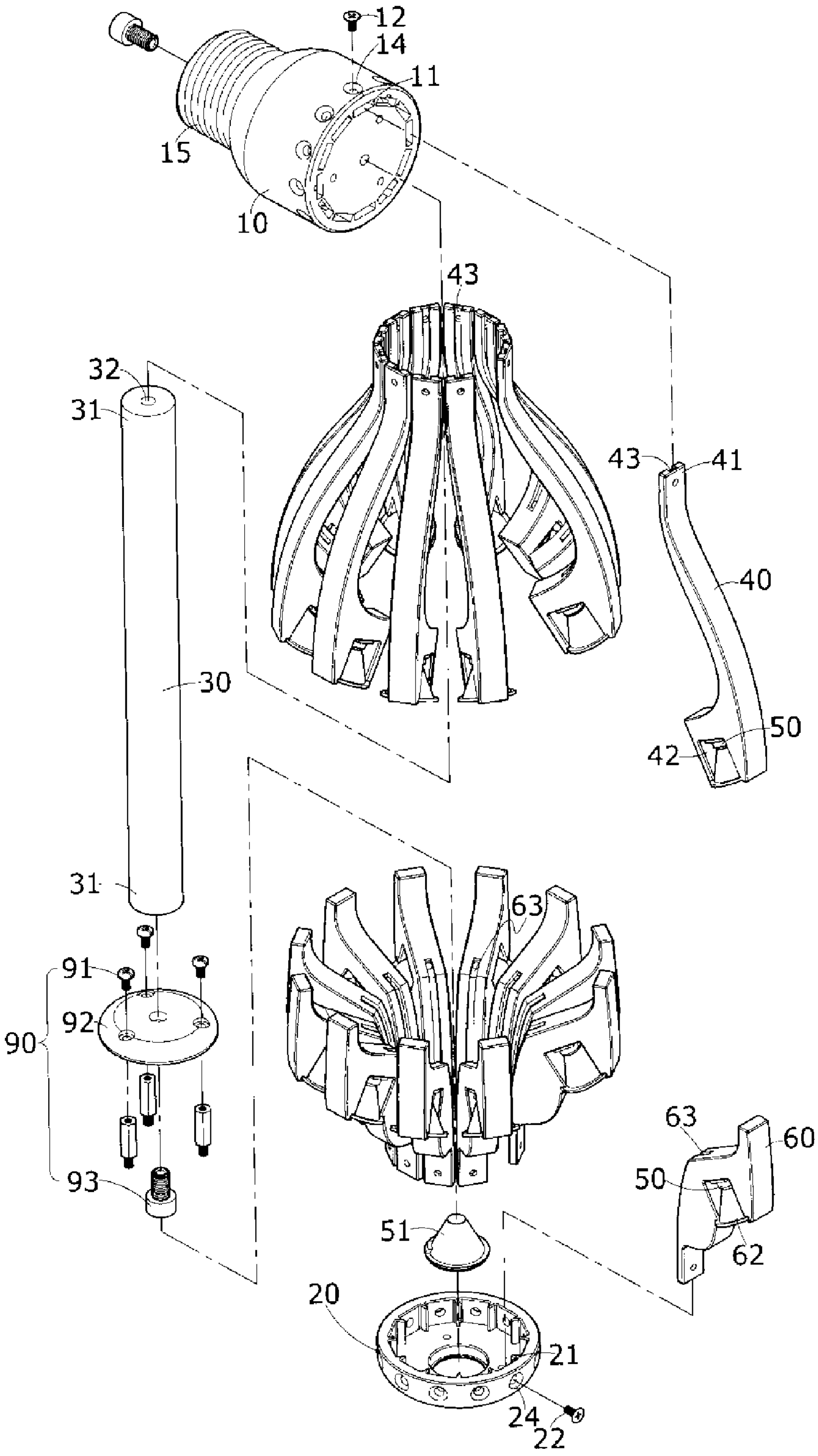
FIG. 2 is an exploded view of the lighting device of the embodiment of FIG. 1.

The present invention will now be explained with reference to the drawings, in particular to FIGS. 1-3, which illustrate a lighting device in accordance with a first embodiment of the present invention. The lighting device of the first embodiment comprises a cover 10, a cap 20 that is arranged opposite to and longitudinally spaced from the cover 10, a central post 30 having opposite ends respectively coupled to the cover 10 and the cap 20, and a plurality of first and second frames 40, 60 respectively mounted to the cover 10 and the cap 20 in a circumferentially distributed manner.

The cover 10 has a lower circumference having an inside surface forming a plurality of circumferentially distributed slots 11 and an outside surface forming a plurality of fastener holes 14 respectively corresponding to the slots 11 for each receiving a fastener 12 (such as a bolt) extending into the fastener hole 14 in such a way that a tip end of the fastener 12 reaches the respective slot 11. The cover 10 has an upper end forming a coupling base 15 that forms external threading for engaging a light support arm 70.

The cap 20 has a circumferential inside surface forming a plurality of circumferentially distributed slots 21 and an outside surface forming a plurality of fastener holes 24 respectively corresponding to the slots 21 for each receiving a fastener 22 (such as a bolt) extending into the fastener hole 24 and having a tip end reaching the respective slot 21.

The opposite ends 31 of the central post 30 are respectively coupled to the cover 10 and the cap 20. The central post 30 forms centrally cable channel 32 that is recessed from one of the central post 30 for the extension of an electrical cable therethrough. In the embodiment illustrated, the central post 30 comprises a hollow cylinder that delimits the central cable channel for the extension of the electrical cable. The coupling of the central post 30 to the cover 10 and the cap 20 is not restricted to any specific manner. For example, in the embodiment illustrated, a threaded fastener extends through the cover 10 or the cap 20 and engages the hollow portion of the central post 30. However, in other embodiments, threading coupling can be employed (such as the cover 10, the cap 20, and the central post 30 being provided with corresponding and engageable threaded portions). Alternatively, tenon and mortise can be used. All these arrangements and other feasible structures are well known to those having ordinary skills in the art and further details are not needed herein. As shown in the example of FIGS. 2 and 3, a coupler assembly 90 is provided, comprising a disk 92 that is fixed to the cover 10 or the cap 20 by means of bolts 91 and a further bolt 93, which is preferably provided with a central bore or otherwise hollowed, is set to effect coupling in the longitudinal direction.

The first frames 40 and the second frames 60 are respectively made in desired forms, such as columns, arcs, or semicircles (arcs being taken as an illustrative example in the embodiment illustrated). Each of the first frames 40 and the second frames 60 forms one or more chambers 42, 62. In the embodiment illustrated, the fasteners 22 extend through the fastener holes 24 and securely engage the ends 41, 61 of the first and second frames 40, 60. The chambers 42, 62 are formed at the opposite ends of the first and second frames 40, 60 to the ends 41, 61, in such a way that the ends 41, 61 and said opposite ends are located on different planes. Particularly, the chamber 42, 62 is set at an outwardly inclined angle, and each of the first and second frames 40,60 has an inner surface that forms a cable passage 43, 63. Further, the ends 41, 61 of the first and second frames 40, 60 are of the same size and specifications.

The chambers 42, 62 receive therein a plurality of light-emitting diodes 50. The first frames 40 and the second frames 60 comprise metal frames that are of excellent heat dissipation natures, such as aluminum frames, aluminum alloy frames, or other equivalent frames that are light weight and having excellent heat dissipation performance. Thus, the first frames 40 and the second frames 60 can serve as both heat dissipation means for the light-emitting diodes 50 and a shade of the lighting device. Further, the cap 20 is preferably provided at a central portion thereof with at least one light-emitting diode 51.

The ends 41, 61 of the first frames 40 and the second frames 60 are fit into the slots 11, 21 of the cover 10 and the cap 20 respectively, and are secured therein by the fasteners 22. The opposite ends of the first frames 40 and the second frames 60 can be made any desired configuration and also carry the light-emitting diodes 50 to serve as a lighting source. In other words, although in the embodiment illustrated, the first frames 40 and the second frames 60 are arranged to form a shade for the lighting device, they can be arranged differently in respect of configuration, location, and number for other embodiments.

Figure 4:
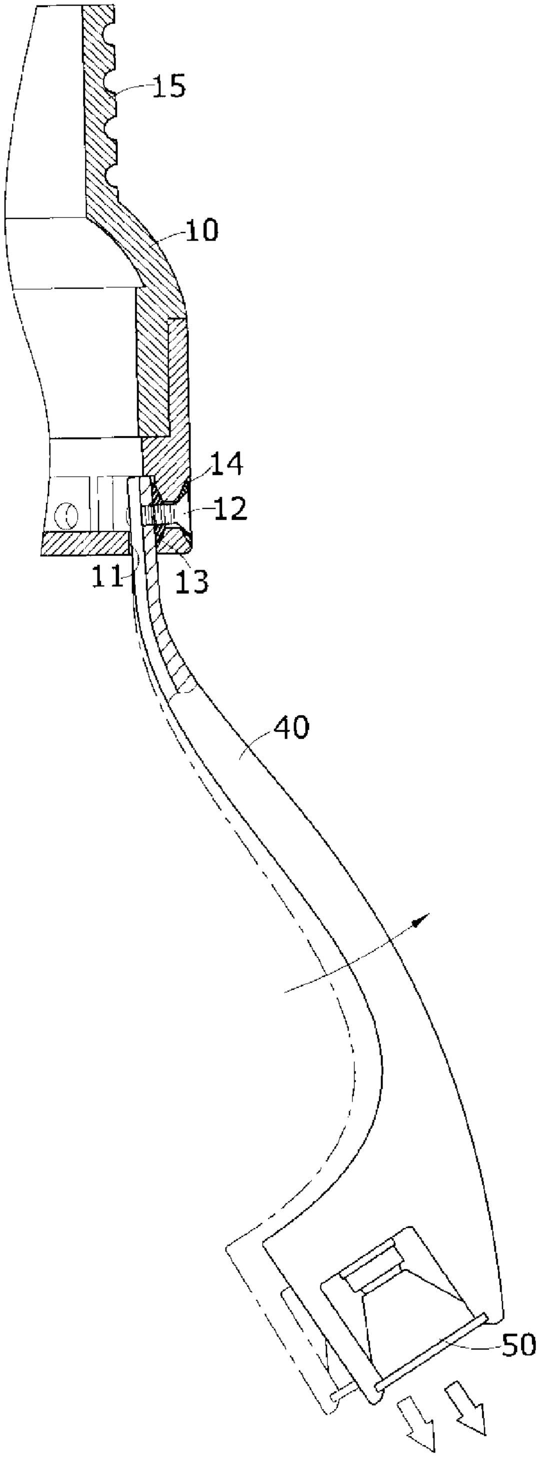
FIG. 4 is a cross-sectional view of a portion of a lighting device in accordance with another embodiment of the present invention, showing adjustment of orientation of a frame of the lighting device.

Referring to FIG. 4, another embodiment of the present invention is 20 shown, in which the cover 10 is particularly illustrated for explanation. The slots 11 of the cover 10 in this instant embodiment are enlarged and form an inclination. A pad 13 is set in each slot 11. When the fastener 12 is fit into the respectively fastener hole 14 and gets tightened, the corresponding one of the first frames 40 is made orientation adjustable through the inclination of the slot 11, as indicated by arrow, whereby the projection orientation of the light-emitting diode 50 is adjustable. Similarly, this adjustable arrangement can also be embodied between the cap 20 and the second frames 60 shown in FIG. 2 to provide flexible adjustment of the lighting orientation.

Referring back to FIG. 1, the coupling base 15 is formed atop the cover 10 to couple with the support arm 70 or other fixture. Since the slots 11 of the cover 10 and the slots 21 of the cap 20 are all identical and since the opposite ends of the first frames 40 and those of the second frames 60 are set on different planes, when viewed as a whole, the first frames 40 and the second frames 60 are made diverging in a direction toward each other, even though the first frames 40 and the second frames 60 connected to the cover 10 and the cap 20 may be of the same number.

Figure 5:
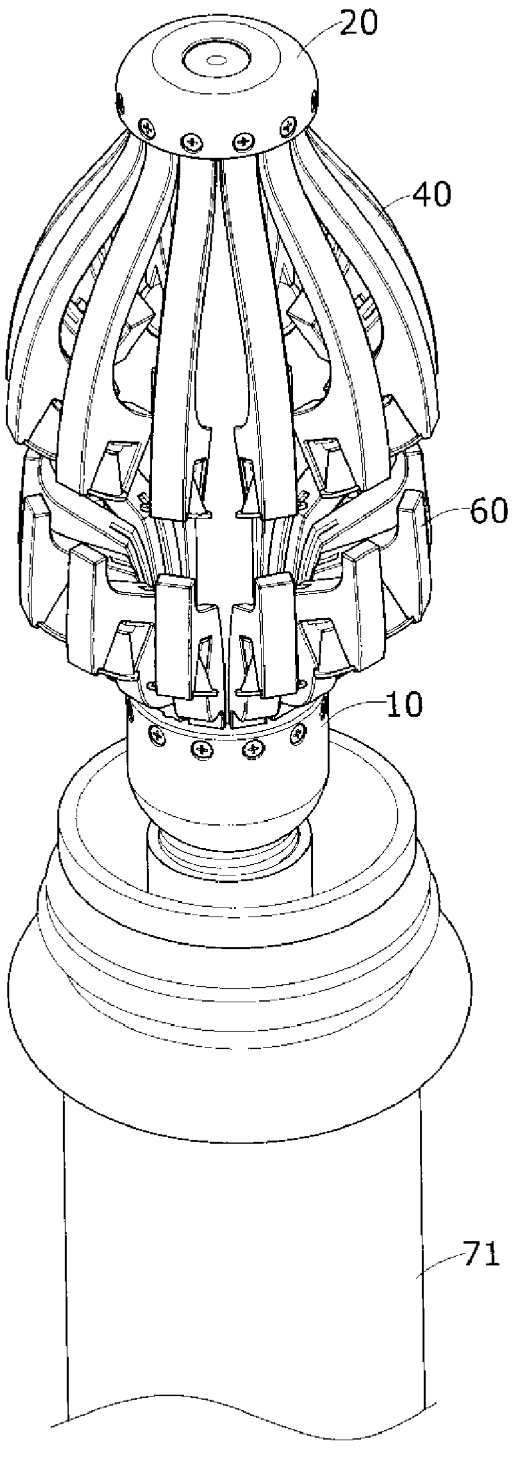
FIG. 5 is a perspective view showing a lighting device in accordance with a further embodiment of the present invention, in which a cap and a cover of the lighting device are exchanged.

Referring to FIG. 5, a further embodiment of the present invention is shown, of which the same components/parts as those shown in the previous embodiments, will not be repeatedly described. The instant embodiment demonstrates an application to an upright pole or stand 71 in such a way that the cap 20 is located on the upper side while the cover 10 on the lower side, with the cover 10 being first coupled to the pole 71 and the first frames 40 and the second frames 60 that carry the light-emitting diodes 50 and serve as a shade exchanged with each other. In other words, the first frames 40 are mounted to the cap 20 and the second frames 60 are mounted to the cover 10.

Figure 6:
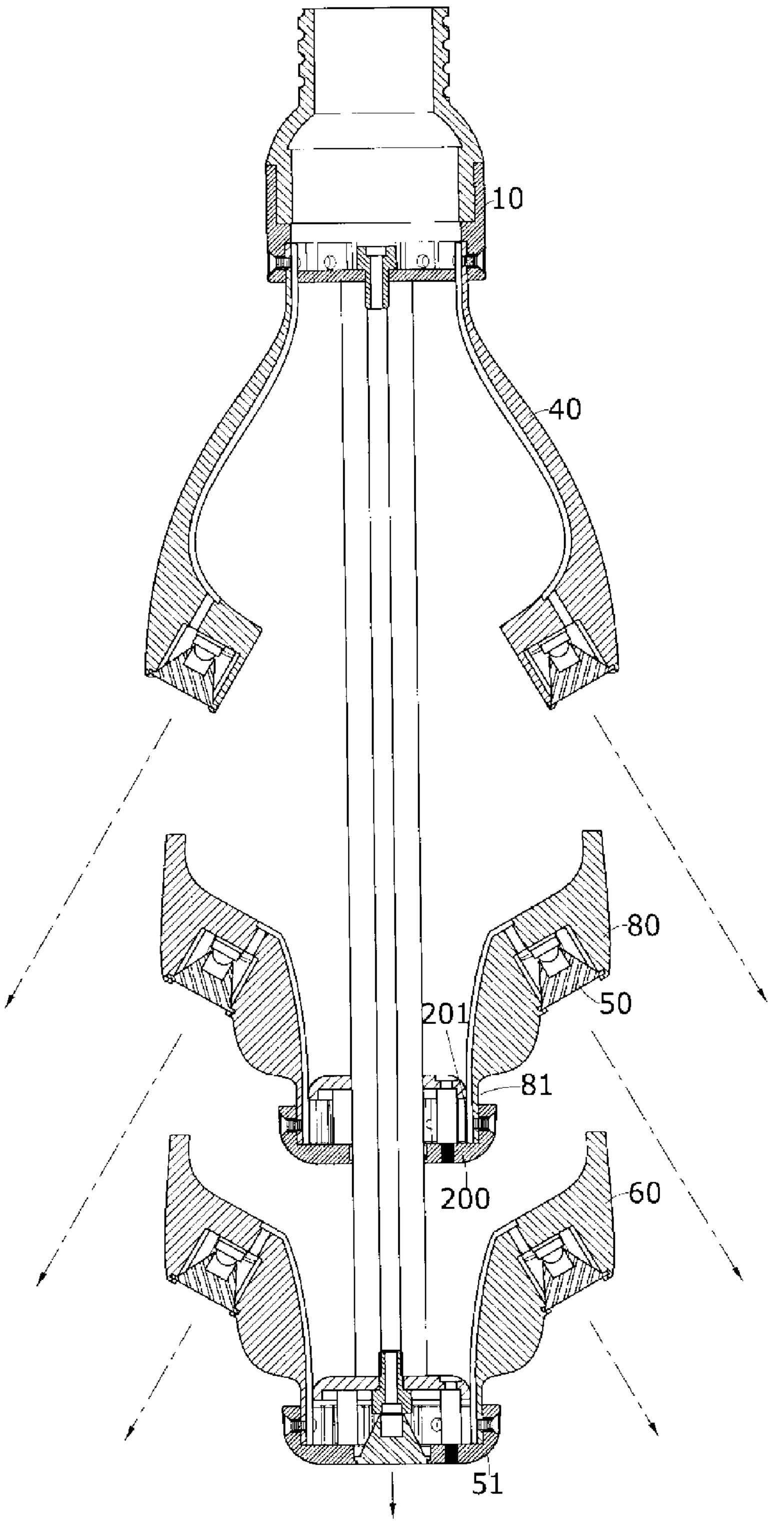
FIG. 6 is a cross-sectional view of a lighting device in accordance with yet a further embodiment of the present invention, illustrating three layers of lighting sources.

Referring to FIG. 6, a further embodiment of the present invention is shown, wherein a major difference resides in the addition of an additional set of intermediate frames. The central post 30 is properly extended in the length thereof to provide an additional space between the cover 10 and 20 for receiving an intermediate ring 200 coupled to the central post 30. The intermediate ring 200 has an outer circumference forming a plurality of slots 201, which are preferably distributed along the circumference, for receiving and retaining the set of intermediate, third frames 80. The third frames 80 can be configured similar to the second frames 60, or being alternatively made elongate bars, having ends 81 fit into the slots 201 to form a further layer of shade that carries the light sources. Such an arrangement can be further expanded to include more layers of light sources to the lighting device. Such an expanded arrangement is structurally similar to the assembly among the cap 20, the cover 10, the first frames 40 and the second frames 60, and thus no further details are needed herein.

Figure 3:
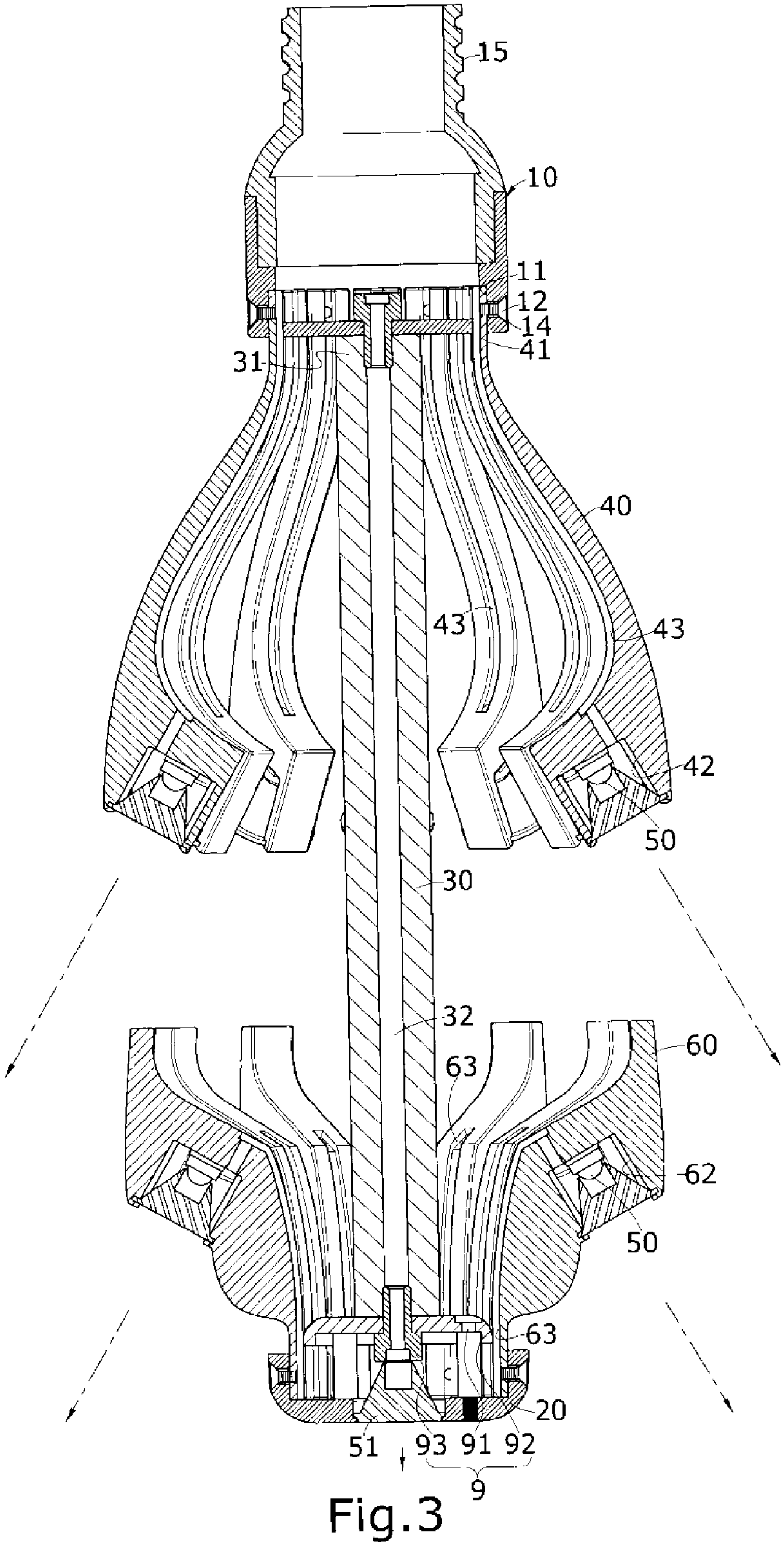
FIG. 3 is a cross-sectional view of the lighting device of FIG. 2 in assembled form.

Referring to FIGS. 3 and 6, when the light-emitting diodes 50 and 51 are energized, lighting is realized for a whole surface by the exactly-below central projection zones and concentric projection zones of lights from the light-emitting diodes, and uniform sufficient lighting is provided.

The cover 10, the cap 20, the central post 30, the first frames 40, and the second frames 60 of the present invention can be made of aluminum or aluminum alloys. Thus, these parts themselves provide excellent heat dissipation function and such a heat dissipation function is further enhanced with heat dissipation spacing present between these parts.

Accordingly, the present invention offers the following advantages:

(1) The first frames, the second frames, the cover, and the cap of the present invention together constitute a hollow structure for a lighting device, which prevents heat from staying inside the lighting device, whereby the present invention provides an advantage of being light-weighted and enhanced heat dissipation.

(2) The cover and the cap of the present invention have similar construction and thus they can be exchanged with each other for different applications, whereby the present invention provides another advantage of being suitable for fixtures or poles of various specifications.

(3) The central post of the present invention can be structured to carry multiple layers of the frames, whereby the present invention provides a further advantage of brightness adjustment in accordance with various applications.

(4) The first frames and the second frames of the present invention forms slots that may be of different inclined angles, which may cooperate with light-emitting diodes to adjustably provide lighting for various projection orientation, and this is a further advantage of the present invention.

(5) In the design of the present invention, the first frames and the second frames that are arranged along an outer circumference of the lighting device are configured with an arc or curved, elongated structure, whereby such a configuration may enhance aesthetics of the lighting device of the present invention and the application thereof can be made is a wider range.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A multiple layers of lighting sources light emitting device comprising:

a cover having a lower circumference forming a plurality of circumferentially distributed slots and an upper end forming a threaded bulb coupling base for electrical connection;

a cap having a circumferential inside surface forming a plurality of circumferentially distributed slots;

a central post having opposite ends respectively coupled to the cover and the cap; and a plurality of first frames each having a first end fit into each slot of the cover and an opposite second end to which a light-emitting diode is mounted and a plurality of second frames each having a first end fit into each slot of the cap and an opposite second end to which a light-emitting diode is mounted.

2. The lighting device according to claim 1, wherein the cover and the cap have an outside surface forming bolt holes corresponding to the slots.

3. The lighting device according to claim 1, wherein the second end of each of the first and second frames forms a chamber.

4. The lighting device according to claim 3, wherein the light-emitting diode of each frame is set in the chamber of the frame.

5. The lighting device according to claim 3, wherein the chamber is set at an outwardly inclined angle.

6. The lighting device according to claim 1, wherein the central post forms a cable channel extending therethrough.

7. The lighting device according to claim 1, wherein the opposite ends of each of the first and second frame are set on different planes.

8. The lighting device according to claim 1, wherein each of the first and second frames forms therein a cable passage.

9. The lighting device according to claim 1, wherein the slot of the first and second frames is provided with an orientation adjusting pad.

10. The lighting device according to claim 1 further comprising an intermediate ring having a circumference forming a plurality of circumferentially distributed slots.

11. The lighting device according to claim 10, wherein the slots of the intermediate ring respectively receive therein third frames that carry light-emitting diodes.

12. The lighting device according to claim 1, wherein the cap comprises a light-emitting diode mounted to a central portion thereof.

* * * * *